United States Patent [19]

Aizawa et al.

[11] 4,363,254
[45] Dec. 14, 1982

[54] HORIZONTAL BANDSAW MACHINE

[75] Inventors: Tsuneo Aizawa; Kenji Onishi, both of Isehara, Japan

[73] Assignee: Amada Company, Limited, Japan

[21] Appl. No.: 221,358

[22] Filed: Dec. 29, 1980

[30] Foreign Application Priority Data

Dec. 28, 1979 [JP] Japan ................................ 54-170418

[51] Int. Cl.³ ...................... B23D 55/08; B27B 13/10
[52] U.S. Cl. ........................................ 83/800; 83/360; 83/820
[58] Field of Search ................. 83/820, 796, 800, 801, 83/360

[56] References Cited

U.S. PATENT DOCUMENTS 3,789,717  2/1974  Stolzer ................................ 83/796
3,875,839  4/1975  Aizawa ................................ 83/360

Primary Examiner—Donald R. Schran
Attorney, Agent, or Firm—Wigman & Cohen

[57] ABSTRACT

A horizontal bandsaw machine provided with a detecting means for detecting the cross-sectional length of the workpiece being cut during a cutting operation and an actuating means which is controlled by the detecting means to move either or each of the guide means for guiding the bandsaw blade toward and away from the other.

1 Claim, 2 Drawing Figures

HORIZONTAL BANDSAW MACHINE

BACKGROUND OF THE INVENTION

1. Field of the Invention

The present invention relates generally to horizontal bandsaw machines having a flexible endless bandsaw blade trained around a plurality of wheels or pulleys to perform cutting operations and, more particularly, pertains to guide means for guiding the bandsaw blade according to sizes and shapes of workpieces to be cut in the horizontal bandsaw machines.

2. Description of the Prior Art

As is well known, horizontal bandsaw machines comprise a base on which a workpiece or workpieces to be cut are to be placed and clamped and a saw head assembly in which a flexible endless bandsaw blade is trained around a pair of wheels or pulleys, one of which is power driven to drive the bandsaw blade. In the saw head assembly, the bandsaw blade is slidably held and guided with its cutting edge faced perpendicularly downwardly by a pair of guide means at the cutting zone where cutting is performed so that it may cut into the workpiece to be cut. Either or each of the guide means is arranged to be adjustably moved toward and away from the other to adjust the cutting stretch of the bandsaw blade at the cutting zone according to sizes of the workpieces to be cut, and auxiliary guide means are often provided to supplement the main guide means. Also, the saw head assembly is so arranged as to be raised away from and lowered toward the base by a suitable means such as a hydraulic motor around a hinge pin or along one or more vertically disposed guide means. Thus, in each cutting cycle, the saw head assembly is firstly raised and then lowered towards the base so as to enable the bandsaw blade being driven therein around the wheels to cut the workpiece which has been placed and clamped on the base. Also, in automatic horizontal bandsaw machines, there are provided arrangements for automatically raising and lowering the saw head assembly and automatically feeding workpieces to be cut into the cutting zone after completion of each cutting cycle.

In the horizontal bandsaw machine of the above described arrangement, it is desired to make the span or distance between the guide means for guiding the bandsaw blade as short as possible in order to increase the cutting accuracy and lengthen the life of the bandsaw blade and also minimize the noise occurring during a cutting operation. When the distance between the guide means for the bandsaw blade is too long, the bandsaw blade will have a tendency to be upwardly buckled or bent because of the feeding pressure during a cutting operation and also it will be severely vibrated upwardly and sidewardly. In other words, the longer the distance between the guide means for the bandsaw blade is made, the more the bandsaw blade will be upwardly buckled or bent and severely vibrated during a cutting operation. Also, when the bandsaw blade is upwardly buckled or bent during a cutting operation, its cutting edge will have a tendency to be directed not perpendicularly but aslant to the workpieces to be cut, and as the result the bandsaw blade will laterally deviate or vary out from the desired line of cut to be made on the workpiece. Of course, the bandsaw blade deviating from its proper course will not be able to perform an accurate cutting operation and also it will be undesirably worn and broken very often. Also, the vibration of the bandsaw blade will not only increase the noise during a cutting operation but also it will result in poor cutting accuracy and short life of the bandsaw blade.

In the conventional horizontal bandsaw machines, the distance between the guide means for guiding the bandsaw blade is adjusted so as to be made as short as possible according to the largest cross-sectional portion of the workpiece to be cut. More particularly, either of the guide means that is adjustably movable is set to the nearest position possible to the other in a manner such that the bandsaw blade can cut the largest cross-sectional portion of the workpiece to be cut in the conventional horizontal bandsaw machines. Also, the distance between the guide means in the conventional horizontal bandsaw machines is not changed but is kept fixed during a cutting cycle after it is initially set according to the largest cross-sectional length of the workpiece to be cut. Accordingly, the distance between the guide means adjusted to be set according to the largest cross-sectional length of the workpiece to be cut is too long when the bandsaw blade is cutting the smaller cross-sectional portion of the workpiece in the conventional horizontal bandsaw machines. Since the cross-sectional length of the workpiece to be cut varies as the bandsaw blade goes on cutting the workpiece, no really satisfactory cutting can be expected with the distance between the guide means fixedly set to the largest cross-sectional length of the workpiece to be cut. Thus, the cutting accuracy cannot be increased to the highest degree, nor can the life of the bandsaw blade be lengthened to the utmost, nor can the noise be satisfactorily minimized in the conventional horizontal bandsaw machines.

On the other hand, it is desired to automatically adjust the distance between the guide means for the bandsaw blade especially for the purpose of laborsaving and unattended cutting operations in the horizontal bandsaw machines. In the conventional horizontal bandsaw machines, either of the guide means is manually moved toward and away from the other and then manually fixed at a desired position in order to adjust the distance between the guide means, each time when it is desired to cut a workpiece or workpieces of a different size. Accordingly, heretofore, it has been very troublesome to adjust the distance between the guide means, and also it has been impossible to automatically continuously cut workpieces varied in size under unattended operations. Since it has been possible to automatically and continuously feed, clamp and cut workpieces in the conventional horizontal bandsaw machines, it has been desired to automatically adjust the distance between the guide means for the bandsaw blade to automatically continuously cut a variety of workpieces.

SUMMARY OF THE INVENTION

It is an object of the present invention to provide a horizontal bandsaw machine in which the distance between the guide means for guiding the bandsaw blade can be automatically adjusted to be as short as possible according to changes in cross-sectional length of the workpiece being cut during a cutting operation.

It is therefore another object of the present invention to provide a horizontal bandsaw machine in which the cutting accuracy is increased, the life of the bandsaw blade is lengthened and the noise is minimized during a cutting operation.

It is a further object of the present invention to provide a laborsaving horizontal bandsaw machine in which the distance between the guide means for guiding the bandsaw blade is automatically adjusted to be as short as possible whatever sizes of workpieces may be to be cut.

It is therefore a still further object of the present invention to provide an unattended horizontal bandsaw machine in which workpieces varied in size and shape can be automatically continuously fed and cut with no operator under a predetermined program.

These objects of the present invention are accomplished by providing a horizontal bandsaw machine with a detecting means detecting the cross-sectional length of the workpiece being cut during a cutting operation and an actuating means which is controlled by the detecting means to move either or each of the guide means for guiding the bandsaw blade toward and away from the other.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENT

Figure 1:
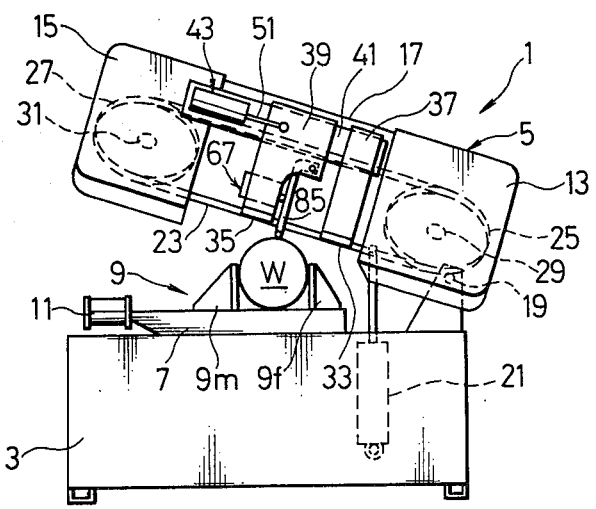
FIG. 1 is a front elevational view of a horizontal bandsaw machine embodying the principles of the present invention.

Referring now to FIG. 1, there is shown a horizontal bandsaw machine which is generally designated by the numeral 1 and comprises a box-like base 3 and a saw head assembly 5 which is movable up and down toward and away from the base 3. The base 3 is provided at its top with a work-table 7 on which a workpiece W to be cut can be placed, and the work-table 7 is provided with a vise assembly 9 which has a fixed jaw 9f and a movable jaw 9m being movable by a suitable means such as a hydraulic motor 11 to clamp the workpiece W to be cut therebetween. The saw head assembly 5 has spaced housing sections 13 and 15 connected with each other by a beam member 17, and it is pivotally connected to the base 3 by means of a hinge pin 19 and is so arranged as to be raised away from and lowered toward the base 3 by a suitable means such as a hydraulic motor 21 of a cylinder type. In the saw head assembly 5, a flexible endless bandsaw blade 23 is trained around a driving wheel 25 and a driven wheel 27 having shafts 29 and 31, respectively, so that it may be driven to make a cutting action when the driving wheel 25 is power driven. The bandsaw blade 23 at the cutting zone of the horizontal bandsaw machine 1 is slidably held or guided with its cutting edge faced vertically downwardly by a pair of guide assemblies 33 and 35 held by carrying members 37 and 39, respectively, so that the cutting stretch may be provided therebetween. The carrying member 37 holding the guide assembly 33 is detachably fixed to a guide way 41 which is fixed to the beam member 17 of the saw head assembly 5 in the preferred embodiment. The carrying member 39 carrying the guide assembly 35 is movably mounted on the guide way 41, and it can be moved toward and away from the carrying member 37 according to the present invention in a manner to be described in great detail hereinafter. Thus, when the saw head assembly 5 is swung down around the hinge pin 19 from its raised position, the bandsaw blade 23 rotating around the driving wheel 25 and the driven wheel 27 in the saw head assembly 5 will be fed to cut the workpiece W clamped by the vise assembly 9 on the work-table 7. Also, the horizontal bandsaw machine 1 may be so arranged that the saw head assembly 5 can be automatically raised and lowered for each cutting cycle and may be provided with automatic feeding and clamping apparatus which will automatically feed and clamp the workpiece W to be cut after completion of each cutting cycle.

In this connection, it should be noted that the present invention is applicable to any suitable known type of horizontal bandsaw machines, although the invention has been and will be described hereinbefore and hereinafter with reference to the horizontal bandsaw machine 1 in which the saw head assembly 5 carrying the bandsaw blade 23 is pivoted about the hinge pin 19. For example, the present invention is also applicable to horizontal bandsaw machines in which a saw head assembly 5 is vertically moved in its entirety along one or more vertical guide means such as a post or posts.

Figure 2:
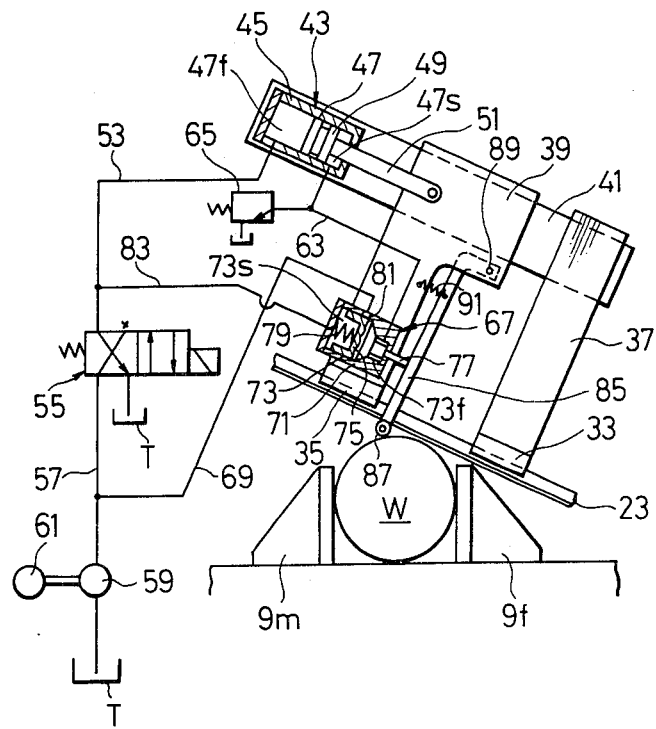
FIG. 2 is a view showing, by an enlarged scale, a portion of the horizontal bandsaw machine shown in FIG. 1 partially diagrammatically.

In order to move the carrying member 39 carrying the guide means 35 along the guide way 41, there is provided a hydraulic motor 43 which is fixedly mounted on the saw head assembly 5. Of course, the carrying member 39 is moved along the guide way 41 toward and away from the carrying member 37 holding the guide assembly 33 to adjust the distance between the guide assemblies 33 and 35 cooperating to slidably hold the bandsaw blade 23. As best shown in FIG. 2, the hydraulic motor 43 comprises a cylinder 45 having a chamber 47 and a piston 49 which has a piston rod 51 and divides the chamber 47 into first and second chambers 47f and 47s. The piston rod 51 of the hydraulic motor 43 is retractably projected out of the cylinder 45 and is connected to the carrying member 39 so that it may move the same toward and away from the carrying member 37 along the guide way 41. The first chamber 47f of the hydraulic motor 43 is connected by means of a passage 53, a solenoid operated valve assembly 55 and another passage 57 to a hydraulic pump 59 which is driven by a motor 61 and is connected with a hydraulic tank T. In the preferred embodiment, the solenoid operated valve assembly 55 is so arranged as to normally connect the first chamber 47f of the hydraulic motor 43 with the hydraulic tank T for drainage and alternatively connect the same chamber to the hydraulic pump 59 when energized or actuated. Also, the solenoid operated valve assembly 55 is so arranged as to be energized or actuated by a suitable actuating means such as a limit switch when the bandsaw blade 23 has been raised higher than the top of the workpiece W to be cut after completion of each cutting cycle by the saw head assembly 5. Thus, the piston 49 and the piston rod 51 of the hydraulic motor 43 are normally movable to move the carrying member 39 away from the carrying member 37, and they will be moved to move the carrying member 39 toward the carrying member 37 when the solenoid operated valve assembly 55 is energized to supply the first chamber 47f of the hydraulic motor 43 with the hydraulic fluid from the hydraulic pump 59.

In order to move the carrying member 39 away from the carrying chamber 37, the second chamber 47s of the hydraulic motor 43 is connected to the hydraulic pump 59 by means of a passage 63 where a relief valve 65 is provided, a control valve assembly 67 and another passage 69 connected to the passage 57. The control valve assembly 67 comprises a cylindrical casing 71 having a chamber 73 and a spool member 75 which is slidably enclosed in the casing 71 to divide the chamber 73 into first and second chambers 73f and 73s and is provided at its end with a projecting member 77 retractably projecting out from the first chamber 73f through the end of the casing 71. The spool member 75 of the control valve assembly 67 is kept biased in the casing 71 toward the first chamber 73f by a spring 79 provided in the second chamber 73s to bias the projecting member 77 outwardly from the first chamber 73f. The passage 63 leading to the second chamber 47s of the hydraulic motor 43 is connected to the end portion of the first chamber 73f of the control valve assembly 67 wherefrom the projecting member 77 of the spool member 75 is projecting out. The passage 69 leading from the hydraulic pump 59 is connected to the first chamber 73f of the control valve assembly 67 through a bore 81 which is formed at the midway portion of the casing 71 in such a manner as to be normally kept closed by the spool member 75 biased by the spring 79 but be made open when the spool member 75 is moved against the spring 79. The control valve assembly 67 of the above described arrangement is mounted on the carrying member 39 in a suitable manner, and it is shown in FIG. 2 as mounted at the lower portion of the carrying member 39 with the projecting member 77 of the spool member 75 projecting toward the carrying member 37 in the preferred embodiment. Also, the second chamber 73s of the control valve assembly 67 may be connected by a passage 83 to the passage 53 connecting the first chamber 47f of the hydraulic motor 43 and the solenoid operated valve assembly 55 so that it may be pressurized when the solenoid operated valve assembly 55 is energized for the purpose to be seen hereinafter. In the above described arrangement, the second chamber 47s of the hydraulic motor 43 is supplied with the hydraulic fluid from the hydraulic pump 59 through the passages 57 and 69, the bore 81 and the first chamber 73f of the control valve assembly 67 and the passage 63 to move the carrying member 39 away from the carrying member 37 when the spool member 75 of the control valve assembly 67 is moved against the spring 79 to open the bore 81. Also, it will be understood that the hydraulic fluid in the second chamber 47s of the hydraulic motor 43 is drained through the relief valve 65 when the piston 49 and the piston rod 51 to be moved to move the carrying member 39 toward the carrying member 37.

In order to control the control valve assembly 67, there is provided an elongate controlling member 85 which is provided at its end with a detecting means 87 and is pivotally connected to the carrying member 39 by means of a hinge pin 89. The controlling member 85 is so disposed as to depend down from the carrying member 39 in contact with the projecting member 77 of the spool member 75 of the control valve assembly 67 in a manner such that the detecting means 87 is located lower than the bandsaw blade 23. Also, the controlling member 85 is kept biased by a spring 91 to the projecting member 77 of the spool member 75 to always keep in contact therewith in such a manner as to be resiliently swung around the hinge pin 89 in both directions. The detecting means 87 is so designed as to move down along the surface of the workpiece W to be cut ahead of the bandsaw blade 23 to detect the shape of the workpiece W as the saw head assembly 5 is lowered to enable the bandsaw 23 to cut the workpiece W. In the preferred embodiment, the detecting means 87 is a roller which is rotatably provided at the lower end of the controlling member 85 to slide down along the surface of the workpiece W to be cut as the saw head assembly 5 is lowered. Thus, it will be understood that the controlling member 85 will be swung by the detecting means 87 around the hinge pin 89 according to the shape of the workpiece W to be cut to control the control valve assembly 67 by pushing or releasing the projecting member 77 of the spool member 75 thereof as the detecting means 87 slides down along the workpiece W to be cut.

In the above described arrangement, the detecting means 87 held by the controlling member 85 will be lowered ahead of the bandsaw blade 23 to firstly come into contact with the workpiece W to be cut and then slide down along the surface of the workpiece W when the saw head assembly 5 is being lowered to enable the bandsaw blade 23 to cut the workpiece W. When the detecting means 87 is sliding down along the workpiece W to be cut, the controlling member 85 is swung by the detecting means 87 around the hinge pin 89 according to the shape of the workpiece W, namely, the changes in the cross-sectional length of the workpiece W, to push or release the projecting member 77 of the spool member 75 of the control valve assembly 67. When the projecting member 77 is pushed by the controlling member 85, the spool member 75 is moved in the casing 71 against the spring 79 to open the bore 81 so as to enable the piston 49 and the piston rod 51 to move the carrying member 39 carrying the guide assembly 35 away from the carrying member 37 holding the guide assembly 33. Also, as the carrying member 39 is moved away from the carrying member 37, the projecting member 77 of the spool member 75 of the control valve assembly 67 will get released from the controlling member 85 to cause the spool member 75 to gradually close the bore 81 to stop the carrying member 39 from moving. From the above description, it will be understood that the distance between the guide assemblies 33 and 35 held by the carrying members 37 and 39, respectively, to guide the bandsaw blade 23 is always kept as short as possible according to the changes in the cross-sectional length of the workpiece W to be cut by the detecting means 87 and the controlling member 85 by means of the control valve assembly 67 and the hydraulic motor 43.

As to the above-described arrangement, it will be apparent to those skilled in the art that the control valve assembly 67 can be so arranged as to supply the hydraulic fluid to both of the first and the the second chambers 47f and 47s of the hydraulic motor 43 to move the carrying member 39 toward and away from the carrying member 37 during a cutting operation. Also, it will be understood that the controlling member 85 can be so formed as to be bent toward the carrying member 37 in order to detect any shapes of workpieces to be cut and that the controlling member 85 and the detecting means 87 can be replaced by any suitable means including electrical means such as a proximity switch arranged to control the hydraulic motor 43. Also, both of the carrying members 37 and 39 can be moved to adjust the distance between the guide means 33 and 35 according to the present invention, although only the carrying member 39 is movable and the carrying member 37 is fixed in the preferred embodiment, and of course the hydraulic motor 43 and related members for moving the carrying member 39 can be replaced by pneumatically operated members. Furthermore, it will be understood that the travelling of the carrying member 39 toward the carrying member 37 can be adjustably limited by a suitable means such as a limit switch which is provided at the guide way 41 so as to be adjusted according to sizes and shapes of workpieces to be cut.

As has been far described in the above, the distance between the guide assemblies 33 and 35 slidably holding the bandsaw blade 23 is kept as short as possible according to changes in cross-sectional length of the workpiece W being cut in the horizontal bandsaw machine 1 according to the present invention. Accordingly, the cutting accuracy is increased and the life of the bandsaw blade 23 is lengthened and furthermore the noise is minimized during a cutting operation in the horizontal bandsaw machine 1 according to the present invention. Also, according to the present invention, the distance between the guide assemblies 33 and 35 is automatically adjusted to keep as short as possible during a cutting operation by the motor 43 which is controlled by the control valve assembly 67 which is also controlled by the detecting means 87 and the controlling member 85 according to changes in cross-sectional length of the workpiece W being cut. Accordingly, in the horizontal bandsaw machine 1 according to the present invention, it is not only unnecessary to manually adjust the distance between the guide assemblies 33 and 35 whatever sizes of workpieces varied in shape may be to be cut, but also workpieces varied in size and shape can be automatically continuously fed and cut with no operator under a predetermined program.

Although a preferred form of the present invention has been illustrated and described, it should be understood that the device is capable of modification by one skilled in the art without departing from the principles of the invention. Accordingly, the scope of the invention is to be limited only by the claim appended hereto.

We claim:

1. In a horizontal bandsaw machine, having a base means for supporting a workpiece to be cut at a cutting zone and a head assembly mounted for movement relative thereto, said head assembly comprising:

an endless bandsaw supported for movement at the head assembly;

a pair of means for guiding the endless bandsaw at the cutting zone;

means for carrying at least one of the pair of guiding means adjustably on the head assembly;

means, mounted on the head assembly, for detecting changes in the cross-sectional length of the workpiece to be cut at the cutting zone; and means, controlled by the detecting means, for driving at least one of the carrying means;

whereby at least one of the pair of guiding means is automatically moved in conformance with detected changes in the cross-sectional length of the workpiece to be cut at the cutting zone.

* * * * *